United States Patent
Li et al.

(10) Patent No.: US 12,417,068 B2
(45) Date of Patent: Sep. 16, 2025

(54) AUDIO SYNCHRONOUS CIRCUIT AND AUDIO SYNCHRONOUS METHOD

(71) Applicant: Realtek Semiconductor Corp., Hsinchu (TW)

(72) Inventors: ZhaoMing Li, Suzhou (CN); YiDong He, Suzhou (CN); TianYi Zhu, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 372 days.

(21) Appl. No.: 18/334,428

(22) Filed: Jun. 14, 2023

(65) Prior Publication Data

US 2024/0143269 A1  May 2, 2024

(30) Foreign Application Priority Data

Oct. 26, 2022  (CN) .......................... 202211316085.5

(51) Int. Cl.
*G06F 3/16* (2006.01)
*H04W 56/00* (2009.01)
*H04W 84/12* (2009.01)

(52) U.S. Cl.
CPC ............ *G06F 3/162* (2013.01); *H04W 56/00* (2013.01); *H04W 84/12* (2013.01)

(58) Field of Classification Search
CPC ........ G06F 3/162; H04W 56/00; H04W 84/12
See application file for complete search history.

(56) References Cited

U.S. PATENT DOCUMENTS

| | | | |
|---|---|---|---|
| 10,602,468 B2* | 3/2020 | Boehlke | .................. H04R 5/04 |
| 2008/0181154 A1* | 7/2008 | Sherman | ............... H04W 48/16 |
| | | | 370/311 |
| 2010/0086093 A1 | 4/2010 | Sheet | |
| 2019/0297589 A1 | 9/2019 | Boehlke et al. | |

FOREIGN PATENT DOCUMENTS

| | | |
|---|---|---|
| CN | 104320843 B | 7/2020 |
| TW | 202236889 A | 9/2022 |

* cited by examiner

*Primary Examiner* — Cheikh T Ndiaye
(74) *Attorney, Agent, or Firm* — McClure, Qualey & Rodack, LLP (57) ABSTRACT

Disclosed are an audio synchronous circuit and an audio synchronous method. The audio synchronous circuit receives at least one beacon packet to generate WiFi time synchronization function (TSF) data, compares the WiFi TSF data with I2S TSF data according to a synchronous control signal to obtain a frequency offset, and compensates a digital audio clock according to the frequency offset. Thus, the audio synchronous circuit can adjust a frequency of the digital audio clock according to the frequency offset to complete synchronization with a transmitter, to avoid unpredictable delays caused by software processing and wireless channel competition, and achieve the purpose of more accurate time synchronization.

12 Claims, 10 Drawing Sheets

AUDIO SYNCHRONOUS CIRCUIT AND AUDIO SYNCHRONOUS METHOD

CROSS REFERENCE TO RELATED PRESENT DISCLOSURE

This application claims the priority benefit of Chinese Patent Application Serial Number 202211316085.5, filed on Oct. 26, 2022, the full disclosure of which is incorporated herein by reference.

BACKGROUND

Technical Field

The present disclosure relates to the field of audio circuit, and in particular, to an audio synchronous circuit and an audio synchronous method of an audio playback system for wireless network.

Related Art

The current sound system includes a host and a plurality of loudspeakers, wherein the host is respectively connected to the plurality of loudspeakers with cables, and the host transmits an audio signal to the plurality of loudspeakers through the cables, so that the audio signal of the host is transmitted to the plurality of loudspeakers for playback.

With the popularity of wireless networks, the wireless network is applied to the existing sound system, the host transmits the audio signal to the plurality of loudspeakers through the wireless network, and the plurality of loudspeakers receive the audio signal through the wireless network, and perform a playback according to the audio signal. The wireless network transmission is used to solve the problem of wiring since the host and the plurality of loudspeakers must be connected by cables and the problem that the audio signal is seriously attenuated by the cables.

However, in the sound system that transmits the audio signal via a wireless network, crystal oscillators used by the host and the plurality of loudspeakers are different, and the crystal oscillators in different devices are affected by temperature differently, so that the oscillation frequencies of the crystal oscillators are different, which causes the plurality of loudspeakers to play the audio signal asynchronously after receiving the audio signal, making the user's hearing of the audio signal be deeply affected.

In the prior art, a precision time protocol (PTP) or a WiFi time synchronization function (WiFi TSF) is used for time synchronization. The PTP mainly provides a method to perform a synchronization procedure on a host and a loudspeaker, wherein the host sends a synchronize message and a follow-up message to the loudspeaker, and then, after receiving the synchronize message and the follow-up message, the loudspeaker sends a delay request message to the host.

In detail, when the host sends the synchronize message to the loudspeaker, the host records a sending time and an arrival time of the synchronize message, encapsulates the sending time of the synchronize message in the follow-up message, and then sends the follow-up message to the loudspeaker. Then, when the loudspeaker sends the delay request message, the loudspeaker records a sending time of the delay request message. Next, when the host obtains the delay request message, the host records an arrival time of the delay request message. After that, the host encapsulates the arrival time of the delay request message in a delay request response message, and transmits the delay request response message to the loudspeaker. When the loudspeaker obtains the sending time and arrival time of the synchronize message, the sending time of the delay request message and the arrival time of the delay request response message, a time offset and a transmission delay are obtained through calculation.

However, when the PTP is used for time synchronization, the loudspeaker can obtain the time offset only after obtaining the sending time and arrival time of the synchronize message, the sending time of the delay request message and the arrival time of the delay request response message. When the loudspeaker does not receive one of the sending time and arrival time of the synchronize message, the sending time of the delay request message and the arrival time of the delay request response message, the synchronization procedure fails at this time, and the transmission delay is sent after steps of recording sending time, software processing, carrier sensing or channel competition. After the loudspeaker receives the aforementioned message, the aforementioned message is passed to the software layer to record the arrival time. The transmission delay is an indeterminate value due to the aforementioned steps. Thus, there is still no way to achieve synchronization in the synchronization procedure.

Furthermore, the WiFi TSF is specified in the communication standards of the IEEE 802.11. When the WiFi TSF is applied to establish a data transmission link between an access device (AP) and a workstation (STA), the AP may synchronize the corresponding timestamp information carried in a beacon frame or a probe response frame with a local TSF timer, so as to keep the time of the local TSF consistent with the time of the access device, to achieve the purpose of time synchronization.

However, in the existing WiFi TSF, the access device only carries timestamp information in the beacon frame or the probe response frame, but does not synchronize the playback of audio signals. Therefore, in the sound system, there is no way to synchronize the received audio signals.

Accordingly, there is a need to further provide a more improved solution.

SUMMARY

In view of the above-mentioned deficiencies in the prior art, the present disclosure provides an audio synchronous circuit and an audio synchronous method. Through a wireless network technology and a digital audio processing technology, the digital audios are synchronized and played, unpredictable delays caused by software processing and wireless channel competition can be avoided, and the more accurate time synchronization can be achieved.

In order to achieve the above purpose, the present disclosure provides an audio synchronous circuit, which includes a synchronous control circuit, periodically outputting a synchronous control signal; a WiFi TSF conversion circuit, receiving WiFi TSF data from at least one beacon packet, and performing a numerical conversion procedure on the WiFi TSF data to generate a converted WiFi TSF data; an I2S TSF timer, receiving a digital audio clock frequency and outputting a I2S TSF count; a I2S TSF circuit, receiving the I2S TSF count and generating I2S TSF data, wherein the WiFi TSF data is not synchronized with the I2S TSF data; a processing circuit, coupled to the WiFi TSF conversion circuit and the I2S TSF circuit, and receiving the synchronous control signal to simultaneously obtain the WiFi TSF data and the I2S TSF data, wherein the processing circuit calculates a count drift and a frequency offset according to the WiFi TSF data and the I2S TSF data; wherein the digital audio clock frequency is compensated according to the frequency offset.

Preferably, the WiFi TSF conversion circuit includes a WiFi TSF circuit; and a compensation calculation circuit, coupled to the WiFi TSF circuit, and outputting a compensation value; wherein the compensation calculation circuit transmits the compensation value to the WiFi TSF circuit, so as to perform an addition operation procedure on the compensation value and the WiFi TSF data to generate the converted WiFi TSF data.

Preferably, the synchronous control circuit further includes a timer, performing a counting procedure according to the at least one beacon packet to generate a beacon count value; wherein the synchronous control circuit compares the beacon count value with a count threshold value to output the synchronous control signal.

Preferably, the processing circuit obtains notification playback time data, and plays the digital audio data according to the notification playback time data.

Through above-mentioned structure, the audio synchronous circuit receives the at least one beacon package to generate the synchronous control signal, compares the WiFi TSF data and the I2S TSF data according to a synchronous control signal to obtain the frequency offset, and compensates for the digital audio clock according to the frequency offset. Thus, the audio synchronous circuit can adjust a frequency of the digital audio clock according to the frequency offset to complete synchronization with a transmitter, to avoid unpredictable delays caused by software processing and wireless channel competition, and achieve the purpose of more accurate time synchronization.

In order to achieve the above purpose, the present disclosure further provides an audio synchronous method, applied to an audio synchronization circuit, including the following steps: obtaining at least one beacon packet and at least one digital audio data through a wireless channel; analyzing the at least one beacon packet to obtain WiFi TSF data; obtaining a digital audio clock frequency of the audio synchronous circuit; generating I2S TSF data according to the digital audio clock frequency, wherein the WiFi TSF data is not synchronized with the I2S TSF data; periodically generating a periodic synchronization signal; performing a numerical conversion procedure on the WiFi TSF data to correspondingly obtain a converted WiFi TSF data; calculating a count drift and a frequency offset according to the converted WiFi TSF data and the I2S TSF data; and compensating for the digital audio clock frequency according to the frequency offset.

Preferably, the step of calculating the count drift and the frequency offset according to the converted WiFi TSF data and the I2S TSF data includes the following sub-steps: performing a difference operation procedure according to the converted WiFi TSF data and last stored converted WiFi TSF data to obtain WiFi TSF incremental data; performing the difference operation procedure according to the I2S TSF data and last stored I2S TSF data to obtain I2S TSF incremental data; and performing the difference operation procedure according to the WiFi TSF incremental data and the I2S TSF incremental data to obtain the count drift.

Preferably, after the step of obtaining the at least one beacon packet and the at least one digital audio data through the wireless channel, the audio synchronous method further includes the following steps: obtaining notification playback time data; and playing the digital audio data according to the notification playback time data.

Preferably, the step of performing the numerical conversion procedure on the WiFi TSF data to correspondingly obtain the converted WiFi TSF data includes the following sub-steps: obtaining a compensation value; and performing an addition operation procedure according to the compensation value and the WiFi TSF data to generate the converted WiFi TSF data.

Preferably, the compensation value has a time unit of nanoseconds.

Preferably, the step of playing the digital audio data includes the following sub-steps: moving the digital audio data; converting the digital audio data into an analog audio signal; and playing the analog audio signal.

Through the above method, the audio synchronous circuit receives the at least one beacon package to generate the synchronous control signal, compares the WiFi TSF data and the I2S TSF data according to the synchronous control signal to obtain the frequency offset, and compensates for the digital audio clock according to the frequency offset. Thus, the audio synchronous circuit can adjust a frequency of the digital audio clock according to the frequency offset to complete synchronization with a transmitter, to avoid unpredictable delays caused by software processing and wireless channel competition, and achieve the purpose of more accurate time synchronization.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

Figure 1:
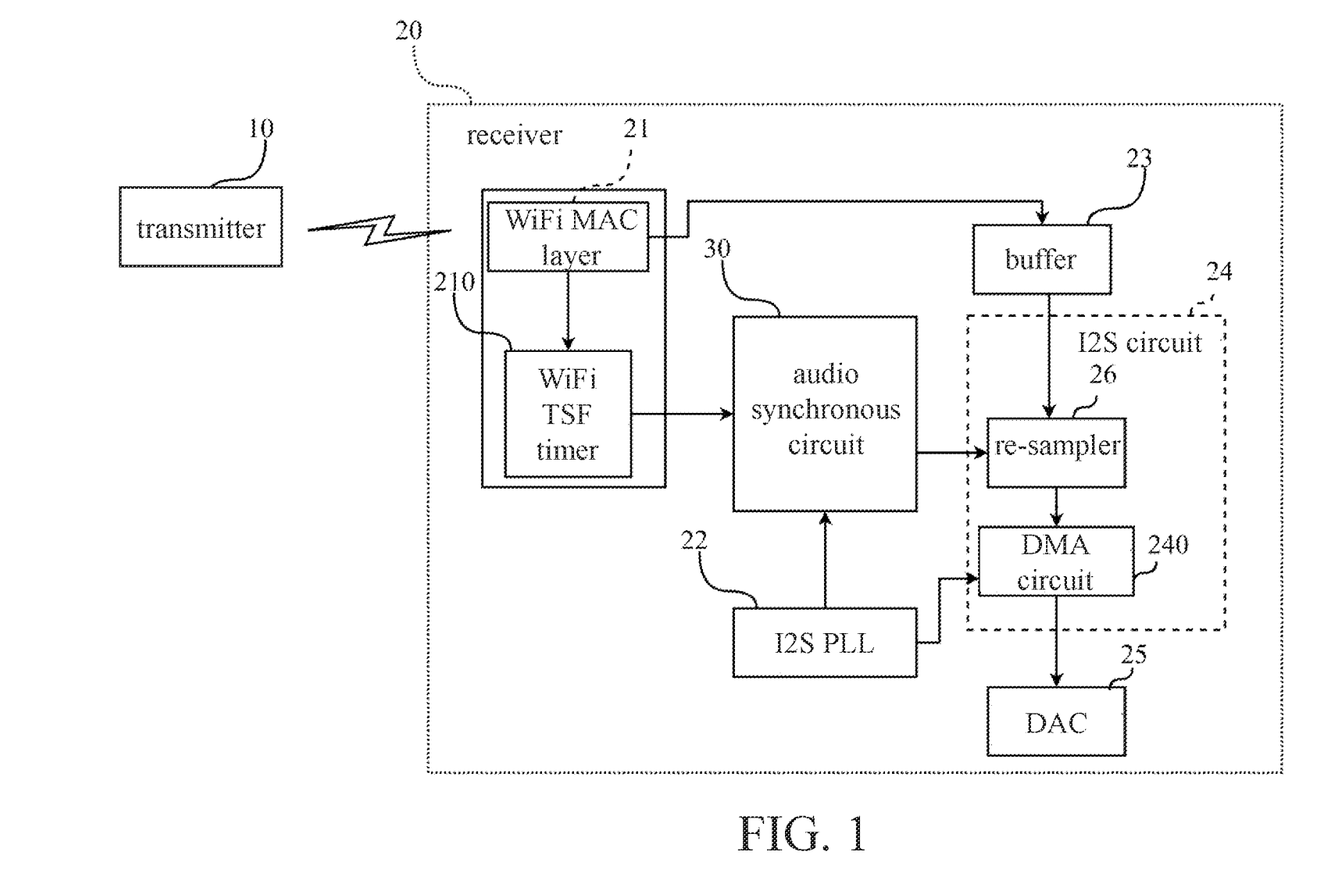
FIG. 1 is a block diagram of an audio synchronous circuit of the present disclosure in an application situation.

The audio synchronous circuit of the present disclosure is applied in an audio playback system for wireless network, as shown in FIG. 1, wherein the audio playback system for wireless network comprises a transmitter (Tx) 10 and a receiver (Rx) 20, the transmitter 10 is linked with the receiver 20 through a wireless channel, the receiver 20 comprises a WiFi media access control (WiFi MAC) layer 21, the WiFi MAC layer 21 comprises a WiFi time synchronization function (TSF) timer 210, and the receiver 20 further comprises an integrated interchip sound phase-locked loops (I2S PLL) 22, a buffer 23, an integrated interchip sound (I2S) circuit 24 and a digital to analog converter (DAC) 25. The audio synchronous circuit 30 is electrically coupled to the WiFi MAC layer 21, the WiFi TSF timer 210, the I2S PLL 22, the buffer 23 and the I2S circuit 24 respectively. The WiFi MAC layer 21 is electrically coupled to the buffer 23, and the I2S circuit 24 is electrically coupled to the I2S PLL 22 and the DAC 25 respectively. In this embodiment, the receiver 20 is a loudspeaker with a wireless network connection.

Specifically, the I2S PLL 22 generates a digital audio clock. When the WiFi MAC layer 21 receives at least one beacon packet and at least one digital audio data from a wireless channel, the beacon packet comprises a timestamp information, the WiFi TSF timer 210 receives the timestamp information to generate Wifi TSF data. In addition, the WiFi MAC layer 21 stores the digital audio data in the buffer 23.

In this embodiment, the I2S circuit 24 comprises a direct memory access (DMA) circuit 240.

Figure 2:
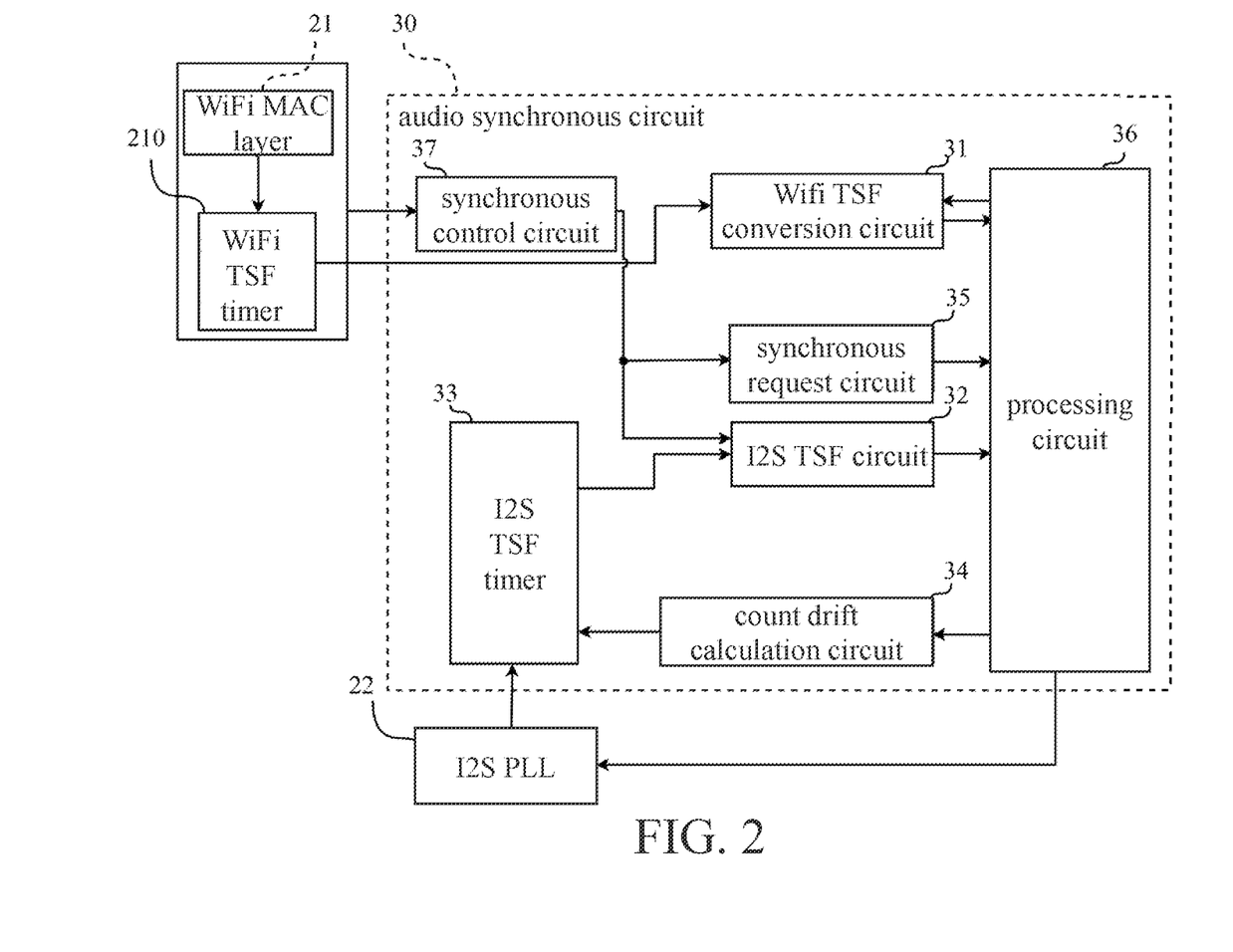
FIG. 2 is a block diagram of an audio synchronous circuit according to a specific embodiment of the present disclosure.

In a specific embodiment of the audio synchronous circuit 30 of the present disclosure, as shown in FIG. 2, the audio synchronous circuit 30 comprises a Wifi TSF conversion circuit 31, an I2S TSF circuit 32, an I2S TSF timer 33, a count drift calculation circuit 34, a synchronous request circuit 35, a processing circuit 36 and a synchronous control circuit 37. In an embodiment, the synchronous request circuit 35 may be omitted, and the processing circuit 36 directly receives the control signal of the synchronous control circuit 37.

In this embodiment, the WiFi TSF conversion circuit 31 is electrically coupled with the synchronous control circuit 37.

In this embodiment, the I2S TSF timer 33 is electrically coupled with the I2S PLL 22, the I2S TSF circuit 32 and the count drift calculation circuit 34 respectively.

In this embodiment, the processing circuit 36 is electrically coupled to the WiFi TSF conversion circuit 31, the I2S TSF circuit 32, the count drift calculation circuit 34 and the synchronous request circuit 35, and the processing circuit 36 is electrically coupled to the I2S PLL 22, the buffer 23 and the I2S circuit 24 respectively.

In this embodiment, the I2S circuit 24 further comprises a re-sampler 26 and a DMA circuit 240.

In this embodiment, the synchronous control circuit 37 periodically outputs a synchronous control signal to the WiFi TSF conversion circuit 31, the I2S TSF circuit 32 and the processing circuit 36, so that the processing circuit 36 can simultaneously obtain WiFi TSF data from the WiFi TSF conversion circuit 31 and I2S TSF data from the I2S TSF circuit 32 according to the synchronous control signal. In another embodiment, the synchronous control circuit 37 generates the synchronous control signal according to the trigger of the at least one beacon packet, and such design can ensure that when the at least one beacon packet is received, the time synchronization mechanism can be started. For example, the synchronous control signal may be triggered to be generated after approximately an interval of 10 beacon packets. In this embodiment, the I2S TSF data of the I2S TSF circuit 32 comes from the I2S TSF timer 33.

In this embodiment, the WiFi TSF conversion circuit 31 receives the WiFi TSF data from the WiFi TSF timer 210, the time unit of the WiFi TSF data is microseconds (μs), and a numerical conversion procedure is performed on the value of the received WiFi TSF data to convert the WiFi TSF data into an I2S domain. At this time, the time unit of the converted WiFi TSF data is nanoseconds (ns). The numerical conversion procedure is used to convert data with the time unit of microseconds (μs) into data with the time unit of nanoseconds (ns).

Figure 3:
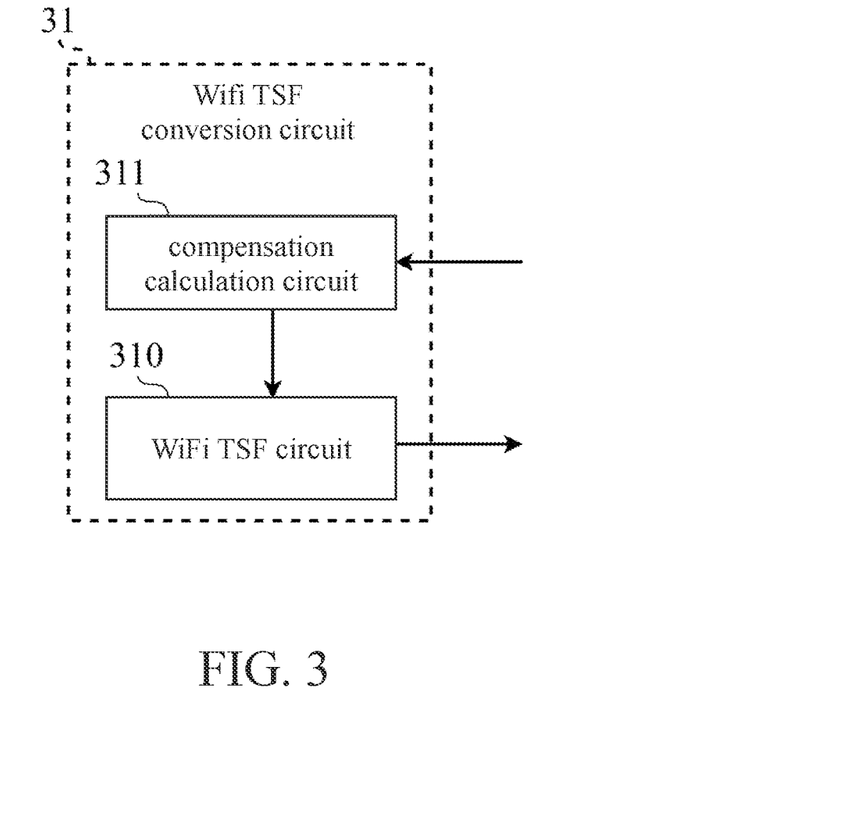
FIG. 3 is a block diagram of a WiFi TSF conversion circuit according to a specific embodiment of the present disclosure.

In this embodiment, as shown in FIG. 3, the WiFi TSF conversion circuit 31 further comprises a WiFi TSF circuit 310 and a compensation calculation circuit 311, and the WiFi TSF circuit 310 is electrically coupled to the compensation calculation circuit 311. Since the function of the WiFi TSF conversion circuit 31 is to convert the time unit of the data from microseconds (μs) to nanoseconds (ns), the compensation calculation circuit 311 in the WiFi TSF conversion circuit 31 is used to calculate the compensation value to compensate the converted WiFi TSF data.

Figure 4:
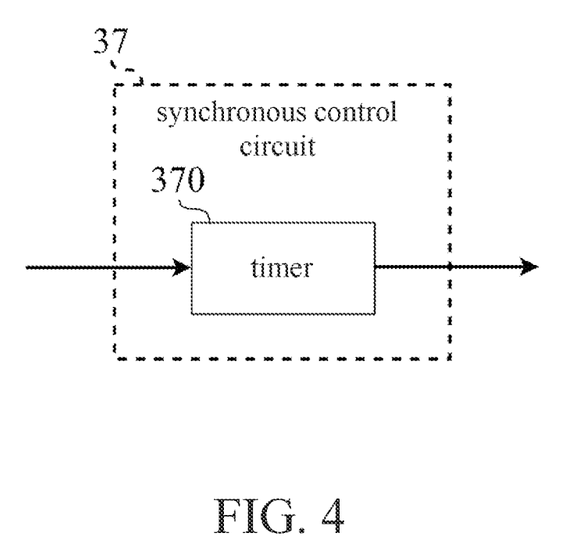
FIG. 4 is a block diagram of a synchronous control circuit according to a specific embodiment of the present disclosure.

In this embodiment, as shown in FIG. 4, the synchronous control circuit 37 stores a counting threshold value, the synchronous control circuit 37 comprises a timer 370, wherein the timer 370 performs a counting procedure according to the at least one beacon packet to generate a beacon count value, and the synchronous control circuit 37 compares the beacon count value with the count threshold value to output the WiFi TSF data. By counting the at least one beacon packet, the WiFi TSF data is output in the case of the least delay, so that the digital audio data can be output synchronously more easily.

In this embodiment, the processing circuit 36 obtains the WiFi TSF data and the I2S TSF data simultaneously according to a synchronous request signal, and calculates a count drift and a frequency offset with a unit of parts per million (PPM) according to the WiFi TSF data in the I2S domain and the I2S TSF data. According to the frequency offset, the I2S PLL 22 is corrected by feedback compensation. At this time, the frequency of the digital audio clock corrected by the feedback compensation achieves a synchronization effect. Preferably, the I2S TSF timer 33 performs compensation simultaneously according to the count drift.

In this embodiment, the synchronous request signal is an interrupt request signal for the processing circuit 36. In this way, when the processing circuit 36 receives the synchronous request signal, it can immediately interrupt other procedures and immediately process synchronization-related procedures. In this embodiment, when the processing circuit 36 receives the interrupt request signal, the processing circuit 36 further performs a difference operation procedure according to the WiFi TSF data in the I2S domain and the last stored WiFi TSF data in the I2S domain (e.g., the data stored in the WiFi TSF circuit 310) to obtain WiFi TSF incremental data, performs the difference operation procedure according to the I2S TSF data and last stored I2S TSF data (e.g., the data stored in the I2S TSF circuit 32) to obtain I2S TSF incremental data. Then, the processing circuit 36 performs the difference operation procedure according to the WiFi TSF incremental data and the I2S TSF incremental data to obtain the count drift, and perform a proportional operation procedure according to the count drift and the WiFi TSF incremental data in the I2S domain, to obtain the frequency offset. In this embodiment, the difference operation procedure is to obtain the difference between the data. For example, the WiFi TSF data in the I2S domain and the last WiFi TSF data in the I2S domain is subtracted to find out the difference between the WiFi TSF data in the I2S domain and the last WiFi TSF data in the I2S domain.

In this embodiment, when the processing circuit 36 performs a subtraction operation procedure according to the converted WiFi TSF data and the WiFi TSF data to calculate a compensation value, the compensation calculation circuit 311 stores the compensation value, and transmits the compensation value to the WiFi TSF circuit 310, so as to perform an addition operation procedure on the compensation value and the WiFi TSF data, to compensate the converted WiFi TSF data. In this embodiment, the compensation value is obtained by subtracting the WiFi TSF data from the WiFi TSF data in the I2S domain.

In one embodiment, the playback time is determined by the TX end (i.e., the master equipment), each slave device is notified of the playback time by the WiFi packet, and the processing circuit 36 gets playback time data accordingly, and transmits the playback time data to each circuit, and the sampled audio data will be played.

Then, when the I2S circuit 24 receives the notification playback time data, the DMA circuit 240 in the I2S circuit 24 moves the digital audio data from the buffer 23, and then transmits the digital audio data to the DAC 25 to convert the digital audio data into an analog audio signal and plays the analog audio signal. In more detail, the frequency of the I2S PLL is used as a digital audio clock after frequency division, the audio data is sent to the audio codec through the I2S protocol for D/A conversion to be converted to an analog audio signal, and then the analog audio signal is played. In other words, the frequency of the I2S PLL 22 affects the speed of audio playback.

In this embodiment, the frequency of the I2S PLL 22 can directly affect the speed of audio playback, and the frequency of the I2S PLL 22 can feed back the dynamic correction synchronization of the compensation. In order to make the playing effect better, the receiver 20 further comprises a re-sampler 26 to improve the playing effect. The re-sampler 26 is electrically coupled to the I2S circuit 24 and the audio synchronous circuit 30.

The clock of the Wifi TSF is associated with the I2S PLL 22 by the audio synchronous circuit, and the digital audio clock frequency of the I2S PLL 22 drives the I2S TSF timer 33. The deviation calculation between the I2S TSF timer 33 and the WiFi TSF timer 210 is calculated to obtain the frequency offset relative to the digital audio frequency of the I2S PLL 22 and the count drift relative to the I2S TSF timer 33, to overcome the problem of asynchrony caused by transmission delay, so that each player can play the digital audio data synchronously.

Figure 5:
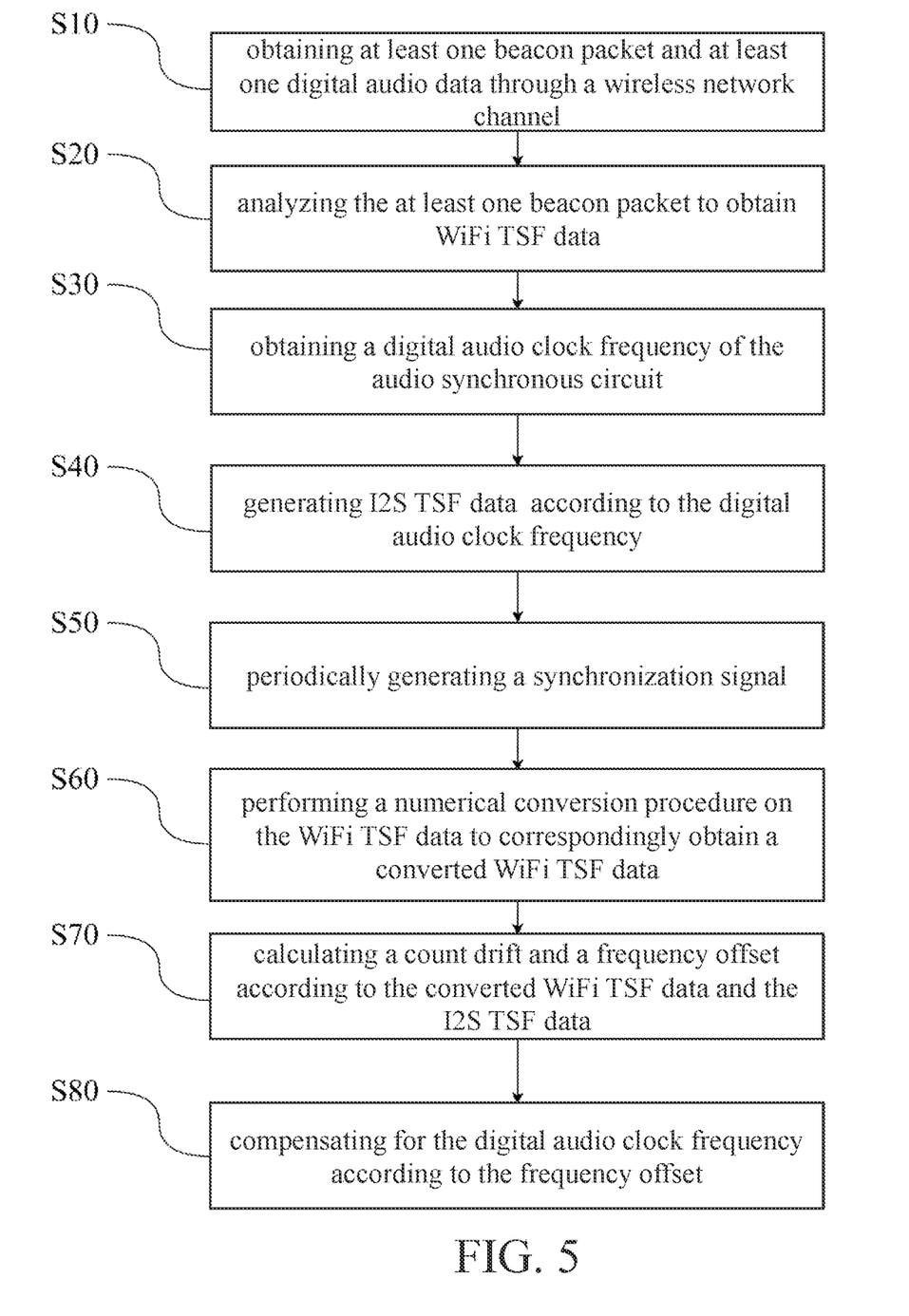
FIG. 5 is a flowchart of an audio synchronous method according to one embodiment of the present disclosure.

In addition, since the aforementioned audio synchronous circuit 30 of the present disclosure is applied in the audio playback system for wireless network, the present disclosure further generalizes an audio synchronous method, as shown in FIG. 5. As an embodiment of the audio synchronous method, the audio synchronous method can be performed by the aforementioned audio synchronous circuit 30 in the following steps: obtaining at least one beacon packet and at least one digital audio data through a wireless channel (S10); analyzing the at least one beacon packet to obtain WiFi TSF data (S20); obtaining a digital audio clock frequency of the audio synchronous circuit (S30); generating I2S TSF data according to the digital audio clock frequency (S40); periodically generating a synchronization signal (S50); performing a numerical conversion procedure on the WiFi TSF data to correspondingly obtain a converted WiFi TSF data (S60); calculating a count drift and a frequency offset according to the converted WiFi TSF data and the I2S TSF data (S70); and compensating for the digital audio clock frequency according to the frequency offset (S80). In step S40, the WiFi TSF data is not synchronized with the I2S TSF data. In step S60 of this embodiment, the numerical conversion procedure mainly is used to convert the WiFi TSF data into the I2S domain to obtain the WiFi TSF data in the I2S domain.

Figure 6:
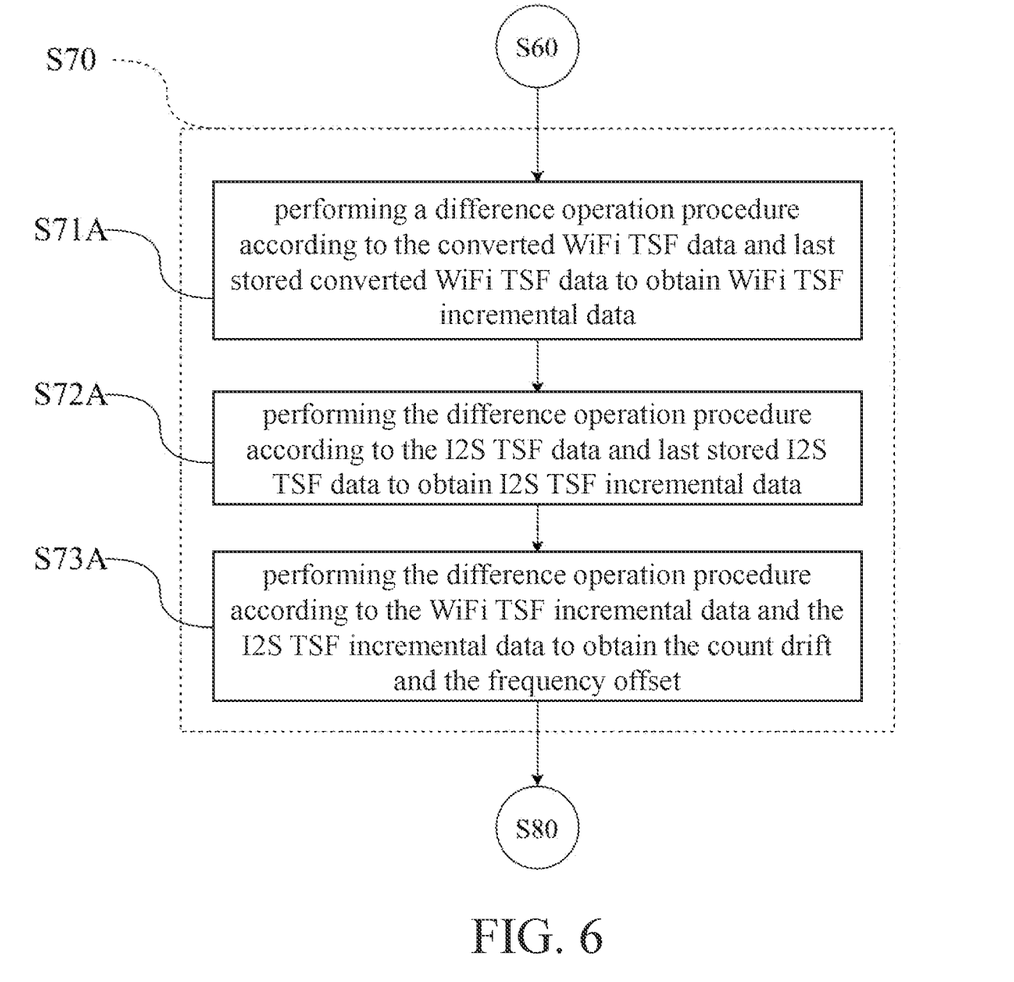
FIG. 6 is a flowchart of an audio synchronous method according to another embodiment of the present disclosure.

In this embodiment, as shown in FIG. 6, the step S70 comprises the following sub-steps: performing a difference operation procedure according to the converted WiFi TSF data and last stored converted WiFi TSF data to obtain WiFi TSF incremental data (S71A); performing the difference operation procedure according to the I2S TSF data and last stored I2S TSF data to obtain I2S TSF incremental data (S72A); and performing the difference operation procedure according to the WiFi TSF incremental data and the I2S TSF incremental data to obtain the count drift and the frequency offset (S73A).

In this embodiment, the description of the difference operation procedure is as follows: WIFI_TSF_Delta=WIFI_TSF−WIFI_TSF_LastSync; I2S_TSF_Delta=I2S_TSF−I2S_TSF_LastSync. Where WIFI_TSF is the WiFi TSF data, WIFI_TSF_LastSync is the last stored WiFi TSF data, WIFI_TSF_Delta is the WiFi TSF incremental data, I2S_TSF is the I2S TSF data, I2S_TSF_LastSync is the last stored I2S TSF data, and I2S_TSF_Delta is the I2S_TSF incremental data.

When the clock of the WiFi TSF timer 210 is synchronized with the clock of the I2S_TSF timer 33, WIFI_TSF_Delta=I2S_TSF_Delta. When the clock of the WiFi TSF timer 210 is not synchronized with the clock of the I2S TSF timer 33, the difference between the WiFi TSF incremental data and he I2S TSF incremental data (i.e., WIFI_TSF_Delta−I2S_TSF_Delta) is only related to the difference between the two clocks. Therefore, this feature can be used to accurately obtain the difference between the two clocks, which will be described later.

By the two values (i.e., WIFI_TSF_Delta and I2S_TSF_Delta), the count drift of the count value of the WiFi TSF timer 210 and the frequency offset of the I2S PLL 22 can be calculated, wherein Drift=WIFI_TSF_Delta−I2S_TSF_Delta; and PPM=Drift/WIFI_TSF_Delta, where Drift is the count drift, and PPM is the frequency offset.

Thus, the clock frequency of the I2S PLL 22 can be calibrated through the frequency offset, and the digital audio data can be re-sampled.

In addition, it is also possible to choose to compensate the count value of the WiFi TSF timer 210. After each compensation, the count value of the WiFi TSF data is equal to the count value of the I2S TSF data. At the next synchronization timing, the count drift is obtained according to the WiFi TSF data and the I2S TSF data (i.e., Drift=WIFI_TSF−I2S_TSF).

Of course, the compensation function of the count drift can be realized according to needs. That is to say, the compensation function of the count drift can be omitted.

Figure 7:
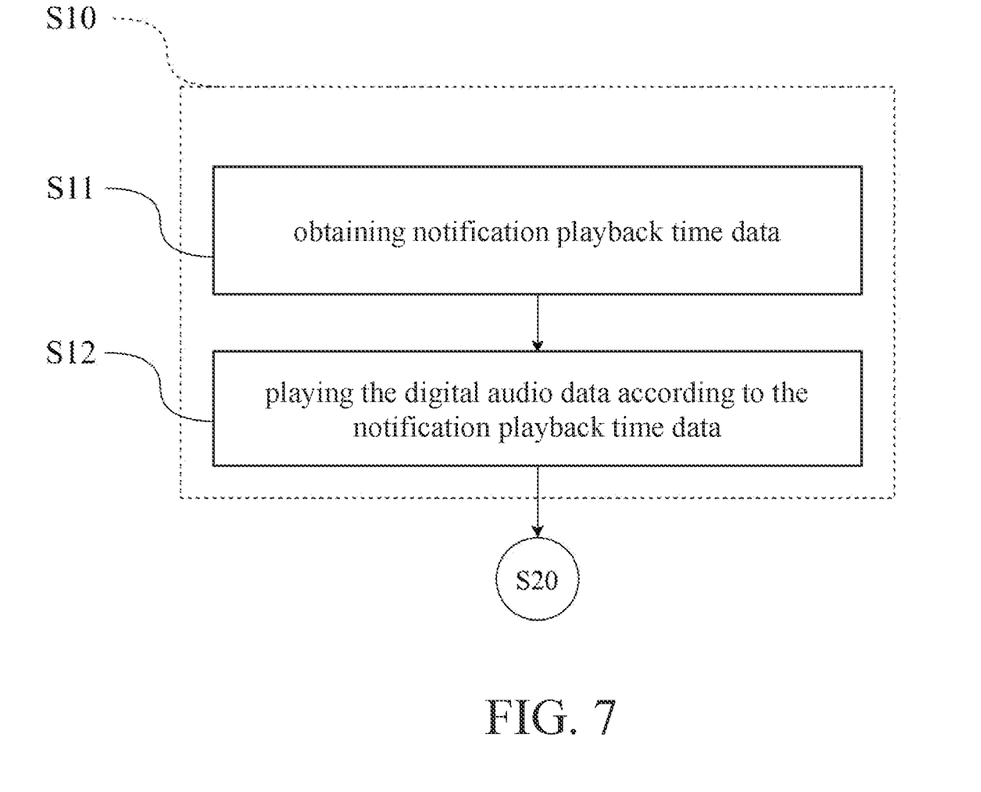
FIG. 7 is a flowchart of an audio synchronous method according to another embodiment of the present disclosure.

In this embodiment, as shown in FIG. 7, the step S10 comprises the following sub-steps: obtaining notification playback time data (S11); and playing the digital audio data according to the notification playback time data (S12).

Figure 8:
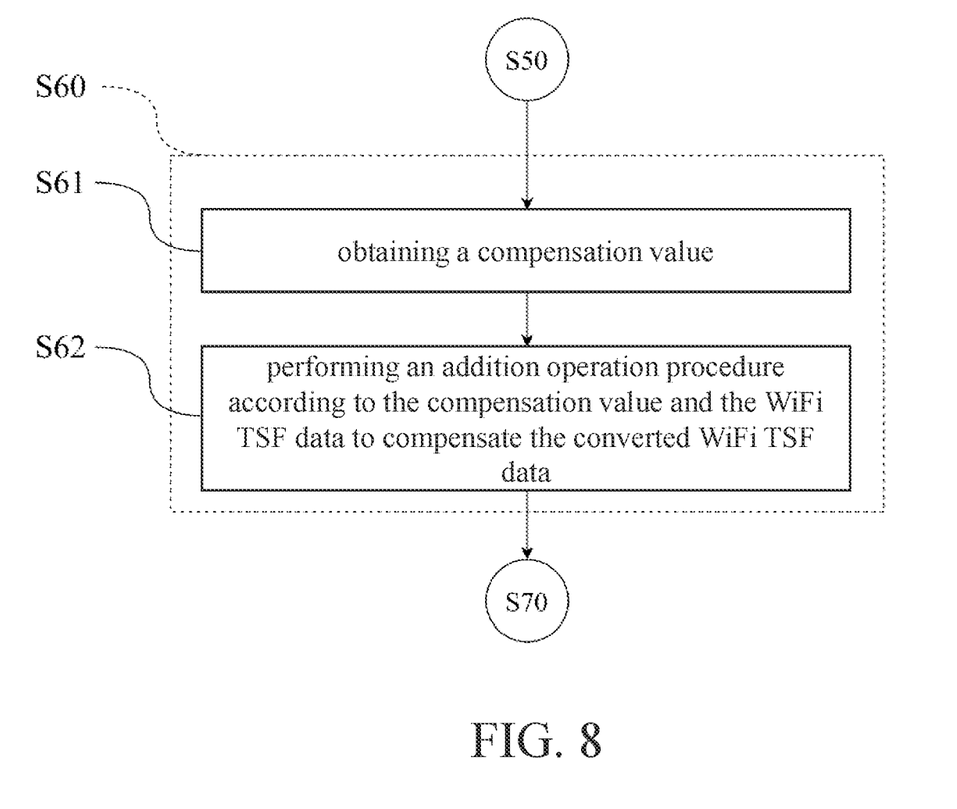
FIG. 8 is a flowchart of an audio synchronous method according to another embodiment of the present disclosure.

In this embodiment, as shown in FIG. 8, the step S60 comprises the following sub-steps: obtaining a compensation value (S61); and performing an addition operation procedure according to the compensation value and the WiFi TSF data to compensate the converted WiFi TSF data (S62). In step S61, the compensation value comprises some delays caused by the circuit's own processing; the time unit of the Wifi TSF timer 210 is microseconds (μs), while the time unit of the I2S domain is nanoseconds (ns) for nanosecond-level compensation. The compensation value is estimated by the compensation calculation circuit 311 according to the processing speed of the entire circuit or obtained by circuit simulation in advance. That is to say, the time unit of the compensation value is nanoseconds.

Figure 9:
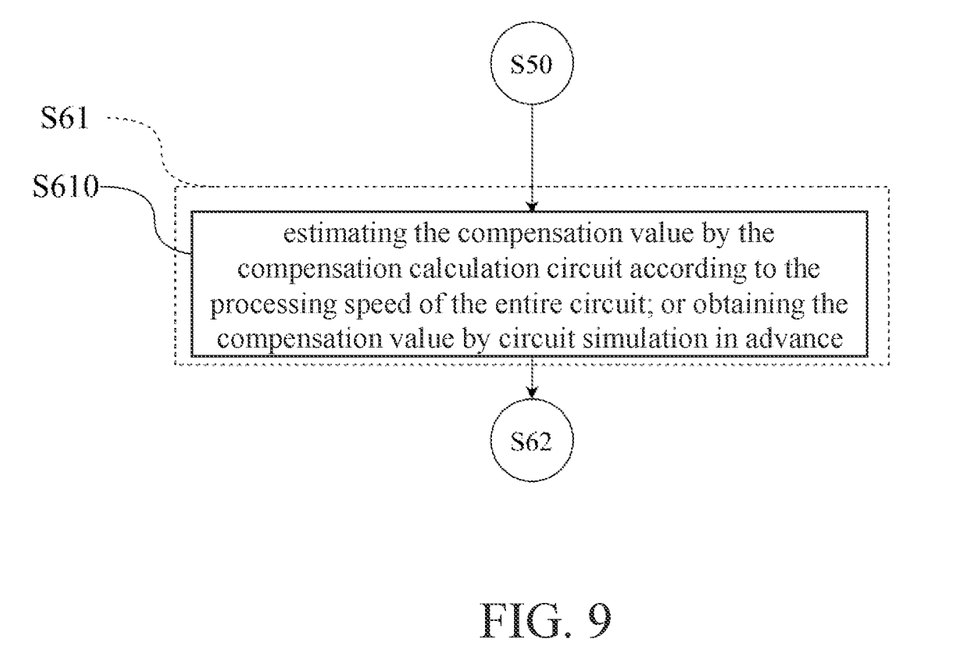
FIG. 9 is a flowchart of an audio synchronous method according to still another embodiment of the present disclosure.

In this embodiment, as shown in FIG. 9, the sub-step S61 comprises the following sub-steps: estimating the compensation value by the compensation calculation circuit 311 according to the processing speed of the entire circuit; or obtaining the compensation value by circuit simulation in advance (S610).

Figure 10:
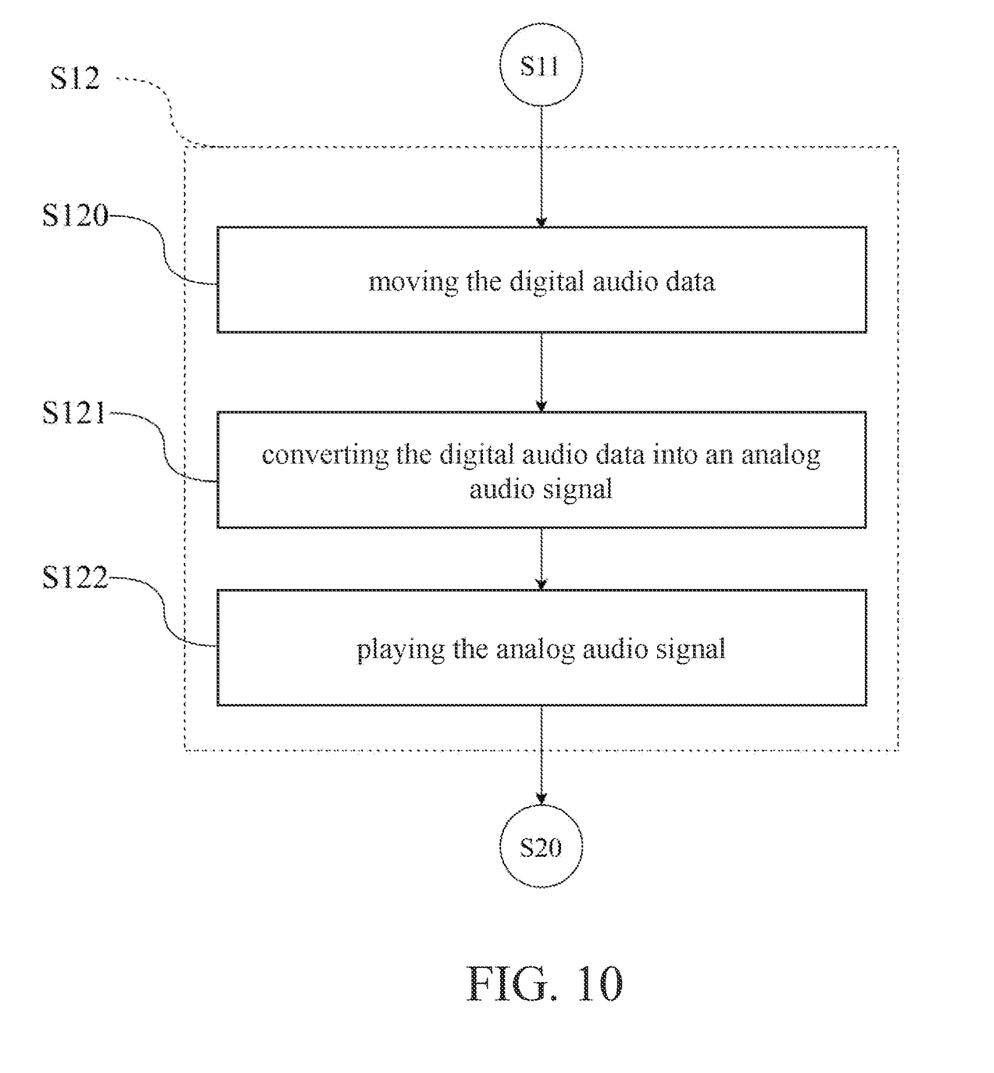
FIG. 10 is a flowchart of an audio synchronous method according to yet another embodiment of the present disclosure.

In this embodiment, as shown in FIG. 10, the sub-step S12 comprises the following sub-steps: moving the digital audio data (S120); converting the digital audio data into an analog audio signal (S121); and playing the analog audio signal (S122).

In summary, in the audio synchronous circuit 30 and the audio synchronous method of the present disclosure, the audio synchronous circuit 30 receives the at least one beacon packet to generate the synchronous control signal, compares the WiFi TSF data and the I2S TSF data according to the synchronous control signal to obtain the frequency offset, and compensates for the digital audio clock frequency according to the frequency offset. Thus, the audio synchronous circuit 30 can adjust the digital audio clock frequency according to the frequency offset, to avoid unpredictable delays caused by software processing and wireless channel competition, and achieve the purpose of more accurate time synchronization.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

The embodiments of the present disclosure have been described above in conjunction with the accompanying drawings, but the present disclosure is not limited to the above-mentioned specific embodiments, which are merely illustrative rather than restrictive. Under the inspiration of the present disclosure, those of ordinary skill in the art can also make many forms without departing from the spirit of the present disclosure and the scope protected by the claims, which all belong to the protection scope of the present disclosure.

What is claimed is:

1. An audio synchronous method, applied to an audio synchronization circuit, comprising the following steps:
obtaining at least one beacon packet and at least one digital audio data through a wireless channel;
analyzing the at least one beacon packet to obtain WiFi time synchronization function (TSF) data;
obtaining a digital audio clock frequency of the audio synchronous circuit;
generating integrated interchip sound (I2S) TSF data according to the digital audio clock frequency, wherein the WiFi TSF data is substantially not synchronized with the I2S TSF data;
periodically generating a periodic synchronization signal;
converting the WiFi TSF data to correspondingly obtain a converted WiFi TSF data;
calculating a count drift and a frequency offset according to the converted WiFi TSF data and the I2S TSF data; and
compensating for the digital audio clock frequency according to the frequency offset.

2. The audio synchronous method according to claim 1, further comprising:
generating WiFi TSF incremental data according to the converted WiFi TSF data and last stored converted WiFi TSF data;
generating I2S TSF incremental data according to the I2S TSF data and last stored I2S TSF data; and
generating the count drift according to the WiFi TSF incremental data and the I2S TSF incremental data.

3. The audio synchronous method according to claim 1, further comprising:
obtaining notification playback time data; and
playing the digital audio data according to the notification playback time data.

4. The audio synchronous method according to claim 1, wherein the step of obtaining the converted WiFi TSF data comprises:
obtaining a compensation value; and
performing an addition operation procedure according to the compensation value and the WiFi TSF data to generate the converted WiFi TSF data.

5. The audio synchronous method according to claim 4, wherein the compensation value has a time unit of nanoseconds.

6. The audio synchronous method according to claim 3, wherein the step of playing the digital audio data comprises the following sub-steps:
moving the digital audio data; and
converting the digital audio data into an analog audio signal according to the digital audio clock frequency.

7. An audio synchronous circuit, comprising:
a synchronous control circuit, periodically outputting a synchronous control signal;
a WiFi time synchronization function (TSF) conversion circuit, receiving WiFi TSF data from at least one beacon packet, and converting the WiFi TSF data to correspondingly obtain a converted WiFi TSF data;
an integrated interchip sound (I2S) TSF timer, receiving a digital audio clock frequency and outputting an I2S TSF count according to the digital audio clock frequency;
an I2S TSF circuit, receiving the I2S TSF count and generating an I2S TSF data, wherein the WiFi TSF data is substantially not synchronized with the I2S TSF data;
a processing circuit, coupled to the WiFi TSF conversion circuit and the I2S TSF circuit, receiving the synchronous control signal to simultaneously obtain the WiFi TSF data and the I2S TSF data, wherein the processing circuit calculates a count drift and a frequency offset according to the WiFi TSF data and the I2S TSF data;

wherein the digital audio clock frequency is compensated according to the frequency offset.

8. The audio synchronous circuit according to claim 7, wherein the WiFi TSF conversion circuit comprises:
   a WiFi TSF circuit; and
   a compensation calculation circuit, coupled to the WiFi TSF circuit, outputting a compensation value to the WiFi TSF circuit, and generating the converted WiFi TSF data according to the compensation value and the WiFi TSF data.

9. The audio synchronous circuit according to claim 8, wherein the compensation value has a time unit of nanoseconds.

10. The audio synchronous circuit according to claim 7, wherein the synchronous control circuit further comprises:
    a timer, performing a counting procedure according to the at least one beacon packet to generate a beacon count value;
    wherein the synchronous control circuit compares the beacon count value with a count threshold value to output the synchronous control signal.

11. The audio synchronous circuit according to claim 7, wherein the processing circuit obtains notification playback time data, and plays digital audio data according to the notification playback time data.

12. The audio synchronous circuit according to claim 7, wherein the processing circuit configures to make an I2S circuit, which coupled to the processing circuit, move the digital audio data from a buffer to a digital-to-analog converter (DAC); and the DAC configures to convert the digital audio data into an analog audio signal according to the digital audio clock frequency.

* * * * *